UNITED STATES PATENT OFFICE.

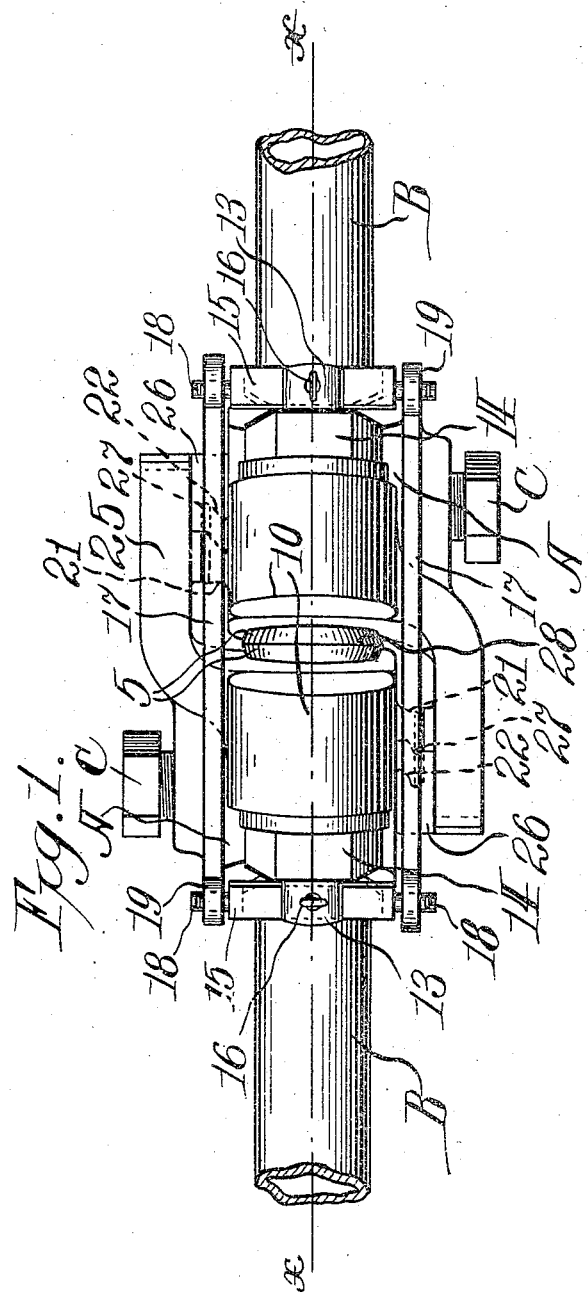

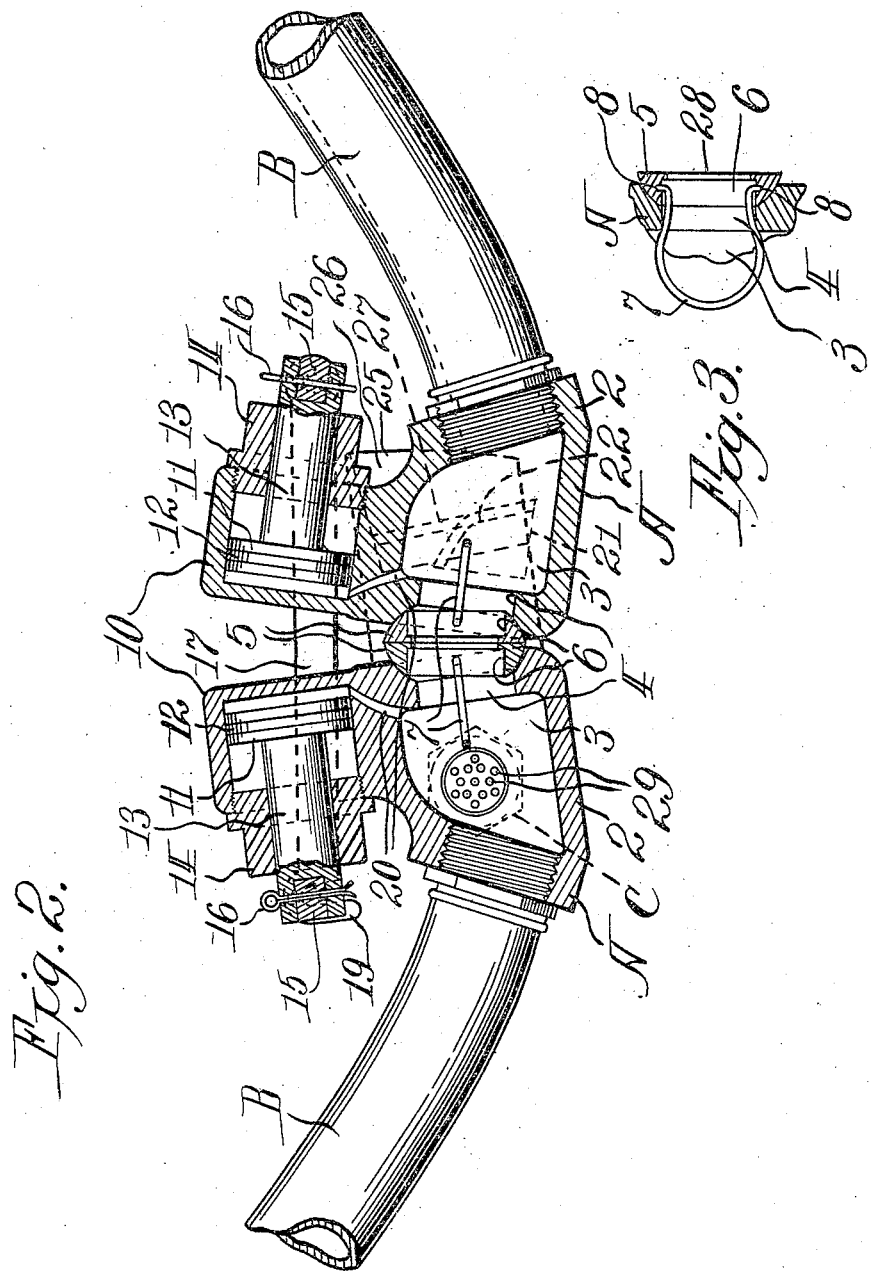

EUGENE J. LOMBARD AND OLE L. KROGSTAD, OF HUDSON, WISCONSIN.

HOSE-COUPLING.

1,055,477.　　　　Specification of Letters Patent.　　Patented Mar. 11, 1913.

Application filed November 27, 1911. Serial No. 662,757.

*To all whom it may concern:*

Be it known that we, EUGENE J. LOMBARD and OLE L. KROGSTAD, citizens of the United States, residing at Hudson, in the county of St. Croix and State of Wisconsin, have invented a new and useful Improvement in Hose-Couplings, of which the following is a specification.

Our invention relates to improvements in hose couplings and is specially adapted to use on steam or air hose connections on railway trains. Its object is to produce a coupling which is interchangeable on all cars and can be readily and conveniently connected in making up trains. Its particular improvement lies in the automatic closing of the joint between the two parts of the coupling when placed in position freely by hand.

The parts are so designed that the wearing of the joint faces does not interfere with its efficiency and the joint closing parts are simple in structure, having no springs or similar wear parts to get out of order.

In the drawings with which we have illustrated our invention and which form a part of this specification, Figure 1 is a plan view of two hose ends joined by our device; Fig. 2 is a section on the line X—X, Fig. 1 showing the operating parts in section, and Fig. 3 is a fragmentary view of the socketed contact part showing a plan of the retaining spring.

In the above drawings are illustrated coupling parts A connected to hose B such as is commonly used on air and steam lines for trains but which may be used for steam, air or liquid as desired, under pressure. Each coupling part A consists of a casing 2 into which the hose B is threaded in any suitable manner. An air chamber 3 occupies the body of the casing 2 and communicates with the hose. Opposite to the hose communication, chamber 3 opens on the face of the casing by a passageway 4. The passageway 4 is enlarged at the face of the casing to form a spherical joint with a contact piece 5 which is freely positioned in the passageway to make a close joint with the wall of the casing through a small angular rotation. The contact piece 5 has a substantially cylindrical passageway 6 extending through it and registering with the passageway 4 to communicate with the chamber 3 and hose B.

A spring 7 has extremities engaging recesses 8 in the passageway 6 of the contact piece 5. The spring extends into the chamber 3 and is formed with curved sides which are adapted to engage the shoulder 9 between the passageway 4 and the chamber 3 to retain the contact piece 5 in operative position.

Above the chamber 3 in casing 2 is formed a cylinder 10 in which is movable a piston 11 provided with a packing ring 12. A piston rod 13 connected with the piston 11 extends through a bushing 14 to the exterior of the cylinder 10 and carries a cross head or equalizer 15 pivoted thereto on a cotter 16. One end of the equalizer 15 carries a link 17 pivoted thereon and fastened by a cotter pin 18. The opposite end of the link 17 is formed with an open hook 19 adapted to hook over the end of an equalizer identical with that on which the link is mounted. The inner end of the cylinder chamber 10 communicates with the chamber 3 through a passageway 20 and air pressure in the hose B and chamber 3 is communicated to the cylinder 10 to produce movement of the piston 11 therein. One side of the casing 2 is provided with a grooved lug 21 having a curved face 22 concave toward the hose connection of the part. The lower part of the face 22 extends below the center line of the passageway 4 in the normal position of the coupling parts. On the side of the casing 2 opposite to the lug 21 is formed an arm 25 projecting away from the hose connection of the casing and outside of the casing of a connected coupling part. At its extremity the arm 25 carries a grooved lug 26 having its grooved face 27 substantially straight and slightly beveled with respect to the axis of the passageway 4. The face 27 is adapted to engage the face 22 of a similar coupling part A placed in opposed position with the contact pieces 5 adjacent to each other. It is evident that the two arms 25 may engage the lugs 21 simultaneously to connect the two coupling parts, the curved form of the faces 22 permitting this connection to be made by an angular movement of the parts A in the plane of the grooves of the lugs.

The contact pieces 5 are formed with plain faces 28 normal to the axes of their passageways 6, adapting the faces to produce an air tight joint when pressed together with sufficient force. The spherical shape of the mounting of the contact pieces 5 in the casing 2 permits the perfect contact of the faces 28 in any position of the two parts A which the parts can normally assume when connected. The curved face 22 of the lug 21 on each part A has such a form that the lug 26 engaging it may be rotated slightly on its point of contact. The lug parts are so formed that their point of contact lies below the axes of the passageways 4 and 6 and movement of the upper portions of the coupling parts A toward each other produces a tightening of the joint between the faces 28 of the contact pieces 5 and seats the contact pieces more firmly in the casings 2.

The tightening movement of the coupling parts A is secured by the action of the pistons 11. The link 17 connected with the equalizer 13 on each piston 11 is hooked over the free end of the equalizer on the other part A in the connected position of the coupling parts. The loose connection of the two parts prevents the escape of steam or air to a large extent and the pressure secured in this way in the chambers 3 forces fluid through the passageways 20 into the piston chambers 10 and produces a movement of the piston chambers with relation to the pistons. The pistons are connected as described by the links 17 preventing their relative movement and the pressure of fluid in the piston chambers causes the movement of the piston chambers with relation to each other and the forcing together of the joints of the contact pieces 5.

In one side of each coupling part A is mounted a relief valve C opening into the chamber 3 and through any suitable apertures such as 29. The relief valve C is ordinarily in the form of a check valve preventing outward movement of fluid and permitting the inflow of air into the hose B and connecting parts when cut off from the steam supply in the steam line.

In accordance with the patent statutes we have described the principles of operation of our invention together with the apparatus which we now consider to represent the best embodiment thereof but we desire to have it understood that the construction shown is only illustrative and that the invention can be carried out by other means and applied to uses other than those above set forth within the scope of the following claims.

Having described our invention, what we claim as new and desire to protect by Letters Patent is:—

1. A hose coupling comprising a pair of detachable members having passages adapted to interconnect and form a duct for a pressure supply, contact pieces freely seated in the abutting end faces of said members and adapted to form a tight joint around said duct, fulcrums adapted to interconnect on the sides of said members and cause said contact pieces to swing together, said members being formed with opposed cylinders having ports in their adjacent ends leading into said duct, pistons in said cylinders and link connections separably connected with said pistons, said pistons and cylinders being so positioned as regards said fulcrums as to cause by outward longitudinal movement of said pistons, said contact pieces to be tilted together under the action of a lever actuated by force derived automatically from said duct.

2. A hose coupling comprising two longitudinally disposed detachable parts having passages adapted to be connected with a source of pressure supply, said parts having contact pieces seated in the end faces thereof and adapted to impinge endwise together and said parts being formed with lateral fulcrums adapted to interconnect on their sides in position to cause said contact pieces to impinge together and with upwardly projecting portions communicating by ducts with said passages, longitudinal hook holders separably securing said detachable parts together above said contact pieces to limit longitudinal spreading movement of said parts, and means on said projecting portions operated by said pressure supply and acting against said holders to tilt and hold said contact pieces longitudinally together under lever action.

In testimony whereof, we have signed our names to this specification, in the presence of two subscribing witnesses.

EUGENE J. LOMBARD,
OLE L. KROGSTAD.

Witnesses:
G. W. BELL,
C. J. MURPHY.